US011850651B2

(12) United States Patent
Urban et al.

(10) Patent No.: US 11,850,651 B2
(45) Date of Patent: Dec. 26, 2023

(54) METHOD OF MANUFACTURING A HEAT-HUMIDITY EXCHANGE PLATE OF AN ENTHALPY AIR-TO-AIR EXCHANGER

(71) Applicant: RECUTECH s.r.o., Pardubice (CZ)

(72) Inventors: Radek Urban, Recany and Labem (CZ); Radim Vitek, Podhorany u Ronova (CZ); Filip Hazuka, Sec (CZ); Jaroslav Chlup, Pardubice (CZ)

(73) Assignee: RECUTECH s.r.o., Pardubice (CZ)

( * ) Notice: Subject to any disclaimer, the term of this patent is extended or adjusted under 35 U.S.C. 154(b) by 0 days.

(21) Appl. No.: 18/106,108

(22) Filed: Feb. 6, 2023

(65) Prior Publication Data
US 2023/0278094 A1    Sep. 7, 2023

(30) Foreign Application Priority Data
Mar. 2, 2022    (EP) .................................... 22159700

(51) Int. Cl.
*B21D 53/04*    (2006.01)

(52) U.S. Cl.
CPC ............... *B21D 53/04* (2013.01); *Y10T 29/18* (2015.01)

(58) Field of Classification Search
CPC .................. B21D 53/04; Y10T 29/18
See application file for complete search history.

(56) References Cited

U.S. PATENT DOCUMENTS

| | | | | |
|---|---|---|---|---|
| 2,920,380 A | * | 1/1960 | Campbell | F28F 3/027 165/171 |
| 3,228,367 A | * | 1/1966 | Donaldson | F28F 1/32 29/890.047 |
| 3,351,995 A | * | 11/1967 | Johnson | B21D 31/043 29/6.1 |
| 4,359,181 A | * | 11/1982 | Chisholm | F28D 9/00 228/183 |
| 4,594,280 A | | 6/1986 | Coyon et al. | |

(Continued)

FOREIGN PATENT DOCUMENTS

| | | |
|---|---|---|
| CZ | 300999 | 10/2009 |
| CZ | 305957 | 5/2016 |

(Continued)

OTHER PUBLICATIONS

EPO Search Report, dated Aug. 19, 2022.

*Primary Examiner* — Sarang Afzali
(74) *Attorney, Agent, or Firm* — Dority & Manning, P.A.

(57) ABSTRACT

A heat and humidity exchange plate for an air-to-air heat exchanger is made by continuously forming an expanded metal structure from a strip of metal foil by slitting the metal foil in a transverse direction, stretching the metal foil in a longitudinal direction, and then rolling over an entire width of the strip of metal foil. The expanded metal structure is subjected to an annealing heat treatment. A vapour-permeable polymeric membrane is provided on the annealed expanded metal structure. Corrugated and embossed-shaped elements are formed on the annealed expanded metal structure with the vapour-permeable polymeric membrane by means of omnidirectional deformation. A circumferential shape of the exchange plate is formed by removing excess edges from the annealed expanded metal structure with the vapour-permeable polymeric membrane.

11 Claims, 5 Drawing Sheets

(56) References Cited

U.S. PATENT DOCUMENTS

| | | | | |
|---|---|---|---|---|
| 5,193,611 A | * | 3/1993 | Hesselgreaves | .......... F28F 3/02 |
| | | | | 29/890.039 |
| 7,389,811 B2 | * | 6/2008 | Mulder | ................ F28F 9/0131 |
| | | | | 165/172 |
| 10,041,746 B2 | * | 8/2018 | Riendeau | ............ F28D 21/0015 |
| 10,415,900 B2 | * | 9/2019 | Riendeau | ................ B23P 15/26 |
| 2017/0370609 A1 | * | 12/2017 | Chlup | ................ F28D 21/0014 |

FOREIGN PATENT DOCUMENTS

| | | |
|---|---|---|
| DE | 102004050160 A1 | 4/2006 |
| DE | 202008010685 | 9/2009 |
| EP | 1085273 | 3/2001 |
| EP | 3025108 | 9/2019 |
| EP | 3620742 | 3/2020 |
| EP | 3022508 | 8/2021 |
| GB | 189414146 | 5/1895 |
| GB | 189603692 | 4/1896 |
| JP | S5982127 A | 5/1984 |
| JP | H04266431 A | 9/1992 |

\* cited by examiner

METHOD OF MANUFACTURING A HEAT-HUMIDITY EXCHANGE PLATE OF AN ENTHALPY AIR-TO-AIR EXCHANGER

TECHNICAL FIELD

The invention relates to a method of producing a heat and humidity exchange plate of an air-to-air counterflow enthalpy heat exchanger, wherein the plate comprises a supporting member and at least one vapour-permeable polymeric membrane.

The invention further relates to a heat and humidity exchange plate of an air-to-air counterflow enthalpy heat exchanger comprising a supporting member whose at least one side is covered with a vapour-permeable polymeric membrane, the central portion of the plate having the shape of a rectangular quadrilateral, wherein end portions formed at the ends thereof taper away from the central portion, and the plate is shaped into a corrugated or embossed surface, the shaping of the corrugated or embossed surface being different from the shaping of the corrugated or embossed surface of the end portions.

The invention also relates to a counterflow enthalpy heat exchanger with at least three heat and humidity exchange plates, which are arranged parallel to each other and connected to each other around the circumference, each of the inner plates lying between air channels in which air flows in the opposite direction.

The invention further relates to an air-to-air counterflow enthalpy heat exchanger with a central portion in the shape of a parallelogram, at the ends of which, in the direction of air flow, the end portions taper away from the central portion, wherein to separate the air flow in the direction from the inner space to the outer space, contour-matched and air-tight in the direction of air flow heat and humidity exchange plates with shaping means for inducing turbulent flow are arranged. The heat and humidity exchange plate comprises a supporting element covered with a vapour-permeable membrane with embossed elements formed to generate turbulent flow, whereby at least three heat and humidity exchange plates are fastened to each other in parallel so as to form two paths for counterflow air.

BACKGROUND

Document CZ300999 discloses a solution of a counterflow recuperative heat exchanger with thin plates which are made of solid metal material and are provided with embossed elements to increase the heat transfer area. This solution is applicable only for heat exchange and does not allow enthalpy exchange function, i.e., moisture exchange between the supply and exhaust air.

Document CZ305957 discloses a solution of a counterflow enthalpy heat exchanger with plates whose central portion is in the shape of a rectangular quadrilateral, at the ends of which, in the direction of flow, there are end portions which taper away from the central portion and have shaping means for generating turbulent flow, wherein the supporting layer is formed by a non-woven fabric to which a vapour-permeable membrane is applied by pressing or gluing. The disadvantage of this solution is that the supporting structure in the form of a nonwoven fabric has low strength and stiffness and also relatively low thermal conductivity which does not allow a perfect heat transfer between the exhaust and supply air.

Utility model DE202008010685 discloses a heat exchanger having layers arranged in parallel above or below each other, which separate two volumetric flows and allow transfer of thermal energy between the two volumetric flows, each layer having projections and depressions, the projections and depressions of each layer being inclined relative to the projections and depressions of an adjacent layer at a relatively high angle to the projections or depressions of each adjacent layer. The solution does not allow humidity exchange between the exhaust and supply air. It is conceivable according to the document that the individual layers are made of, for example, metallic materials.

Document EP1085273 discloses a heat exchanger consisting of profile elements arranged one above the other, the adjoining profile elements alternating at a positive and negative angle with the longitudinal direction of the heat exchanger. The channels formed by these profiles for the separating plates arranged one above the other form a fixed angle with the flow direction of the heat exchanger. As a result, the same flow cross-section is realized along the entire length of the heat exchanger. The disadvantage of this solution is that there is no humidity exchange between the exhaust and supply air and no turbulent flow occurs, which reduces the efficiency of the heat transfer.

Document EP3025108 discloses a method for the production of enthalpy heat exchanger elements which comprises steps of perforating a flat plate element according to a predetermined perforation pattern within the plate outer dimensions and forming the plate element into a desired embossing pattern and geometrical shape, applying a polymeric film with water vapour permeation characteristics to at least one side of the plate element, whereby a total open area for water vapour transfer of no less than 50% of the available exchange surface area of the plate is provided. Metal foil, preferably aluminium foil, can be used as the plate element. The plate element is perforated using a punch, a perforator or a laser, whereby the proportion of the moisture exchange area, i.e., the total area of the openings in the plate element, is greater than 50% of the total surface area of the plate element.

The disadvantage of this solution is the need to perforate the plate element to which a vapour-permeable membrane is fixed. This perforation results in considerable deformation of the starting material and, due to the requirement for at least 50% of the area of the openings, a significant amount of waste is generated. The waste consists of small parts of the plate element material which must be sucked out or otherwise collected during perforation. In addition, during the perforation of the plate element, burrs are formed, which must then be removed to prevent damage to the vapour-permeable foil in the next production step.

Document EP3620742 discloses a method of producing enthalpy exchanger elements which includes perforation of a flat plate element according to a predetermined perforation pattern within the plate outer dimensions, shaping the plate element into the desired embossing pattern and geometric shape and then applying a multilayer polymeric film with vapour-permeable properties composed of different types of polymers to at least one side of the plate element. Also in this case, the disadvantages of this solution include the need to perforate the plate element to which a vapour-permeable membrane is fixed and generated waste that must be sucked out during perforation. Another disadvantage is the fact that the shaping of the supporting element into the embossing pattern is carried out before the application of the vapour-permeable foil, which increases the risk of the vapour-permeable foil rupture during its application to the embossed surface.

Document EP3022508 discloses manufacturing a plate element of an enthalpy heat exchanger consisting of perforating an unshaped plate element with defined external dimensions in any desired area and in any desired dimension, and subsequently covering at least one side of the plate element with a thin polymeric film with latent energy exchange properties, and then shaping the plate element into the desired shape and pattern of wavy lines and/or reliefs. The starting plate element may be made of plastic or aluminium. The sequential manufacturing operations can be performed in a different order according to this solution. The disadvantage of this solution is again initial perforation of the plate element, in which a considerable amount of material of the starting plate element is removed and thus a considerable amount of waste is generated.

U.S. 10415900B2 discloses a method for the production of enthalpy exchanger elements consisting of the following steps:

perforating a flat plate element according to a predetermined perforation pattern within the plate outer dimensions;

applying to at least one side of the plate element a polymeric film with water vapour permeation characteristics, and forming the plate element into a desired shape with an embossing pattern, wherein the polymeric film is formed into the same embossing pattern as the plate element; the perforation density, defined by the number of perforations per unit area, being greater in the circumferential region of the plate element than in the central region of the plate element to control the efficiency of the enthalpy exchange plate element.

The disadvantage of this solution is mainly the initial perforation of the plate element, during which a significant amount of material is removed and a significant amount of waste is generated.

SUMMARY OF THE INVENTION

Additional objects and advantages of the invention will be set forth in part in the following description, or may be obvious from the description, or may be learned through practice of the invention.

The invention solves the realization of a supporting element of a heat and humidity exchange plate of an air-to-air counterflow enthalpy heat exchanger using the technology of metal foil expansion, where at first a slit is made in the foil in the transverse direction and then the foil is expanded by stretching in a direction perpendicular to the previous slit, i.e., in the longitudinal direction. In this way, the waste that would be generated by perforating the material of the support semi-product according to the background art is avoided and, in addition, a significantly larger surface of the supporting semi-product is obtained compared to the original surface area of the starting metal foil, by up to 20-70%. The basic principles for the production of an expanded metal structure are known, for example, from documents GB189414146 or GB189603692, e.g., for the production of meshes or fence elements. In a preferred embodiment according to the invention, the properties of the expanded metal structure are used to realize heat and humidity exchange plates of an air-to-air counterflow enthalpy heat exchanger with a central portion in the shape of a parallelogram, at the ends of which, in the direction of air flow, are the outermost areas which taper away from the central portion, wherein in order to separate the air flow in the direction from the interior to the exterior, identical in contour and airtight heat and humidity exchange plates with shaping means for inducing turbulent flow are arranged. The supporting element of the heat and humidity exchange plate is an expanded metal structure, preferably made of aluminium or its alloys and covered with a vapour-permeable membrane which is realized in successive technological steps.

The first step is continuous formation of a semi-finished product for the supporting member in the form of an expanded metal structure from a strip of thin metal foil, with successive or simultaneous operations of slitting the strip of thin metal foil in the transverse direction, stretching it in the longitudinal direction and rolling over the entire width of the strip.

After slitting, the thin metal foil is stretched, whereby holes are created in it without any waste. This step increases the surface area/length of the expanded metal structure by 20-70% compared to the original length of the metal foil. Rolling removes the unevenness caused by the deformation of the material during stretching and creates a smooth expanded metal structure without any waste.

In the next step, the expanded metal structure is provided with a thin vapour-permeable polymeric membrane.

On the expanded metal structure provided with the thin vapour-permeable polymeric membrane, corrugated and embossed shape elements of the future heat and humidity plate of the counterflow enthalpy heat exchanger are created by means of omnidirectional deformation, whereupon excess edges are removed and the circumferential shape of the heat and humidity exchange plate of the counterflow enthalpy heat exchanger is formed.

In order to restore the ductility of the expanded metal structure thus formed, it is advisable to include, as a further technological operation, annealing heat treatment of the produced expanded metal structure either continuously or in whole wound coils in an annealing furnace into which the whole wound coils are inserted, wherein it is advisable to monitor the annealing temperature also inside the coil on which the metal structure is wound.

In the next technological step, the expanded metal structure is coated with a thin vapour-permeable polymeric membrane, whereby the connection of the expanded metal structure with the thin polymeric vapour-permeable membrane may be accomplished either by gluing or by thermocompression.

Prior to this step, in order to achieve perfect connection to the vapour-permeable polymeric membrane, it is advantageous to activate the surface of the expanded metal structure and/or the surface of the vapour-permeable polymeric membrane chemically (e.g., with isopropanol) or by plasma treatment. Preferably, the connection of the expanded metal structure to the thin vapour-permeable polymeric membrane is performed over the entire width of the strip of expanded metal structure, which makes it possible to use the semi-finished product thus produced for the production of heat and humidity exchange plates for counterflow enthalpy heat exchangers of various dimensions and sizes.

Another possibility according to the present invention is to create a combination of the supporting expanded metal structure and the vapour-permeable polymeric membrane by applying liquid polymer to the strip of expanded metal structure and subsequently curing it.

Afterwards, on the thus produced expanded metal structure provided with the vapour-permeable polymeric membrane, corrugated and embossed shaping elements of the future heat and humidity exchange plate of a counterflow enthalpy heat exchanger are created by omnidirectional deformation. After the assembly of the exchanger, these elements serve to create turbulent air flow which ensures optimal heat and humidity transfer between the supply and exhaust air.

In the next step, the circumferential shape of the heat and humidity exchange plates of the counterflow enthalpy heat exchanger is created by removing excess edges. Alternatively, this step may be part of the formation of corrugated and embossed shape elements.

The air-to-air counterflow enthalpy heat exchanger consists of at least three heat and humidity exchange plates, attached to each other in parallel to form two paths for counter-flowing air, the plate joints being made by double hem pressing to prevent in the greatest possible extent parasitic air infiltration beyond the defined air flow paths between the external and internal environments.

BRIEF DESCRIPTION OF THE DRAWINGS

The invention will be described with reference to the drawings, wherein.

DETAILED DESCRIPTION

In the following description of the alternative exemplary embodiments represented in the figures, the same reference signs are utilized for features that are identical or at least comparable in terms of their configuration and/or mode of operation. Provided the features are not described in detail again, their design and/or mode of operation correspond/corresponds to the design and mode of operation of the above-described features. For the sake of greater clarity, reference signs for previously described components have not been individually included in the figures.

An air-to-air counterflow enthalpy heat exchanger is a device used to transfer heat and moisture from the air coming out of the indoor service space to the air entering from the outdoor space into the indoor space.

Figure 1:
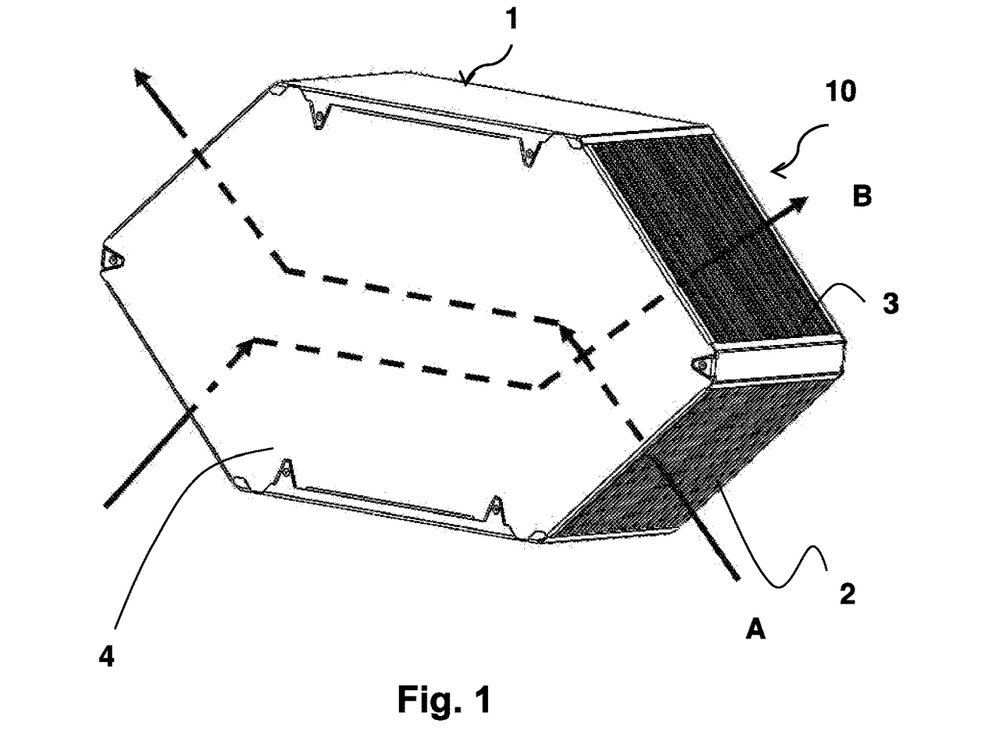
FIG. 1 represents a diagram of a counterflow enthalpy heat exchanger.
Figure 9:
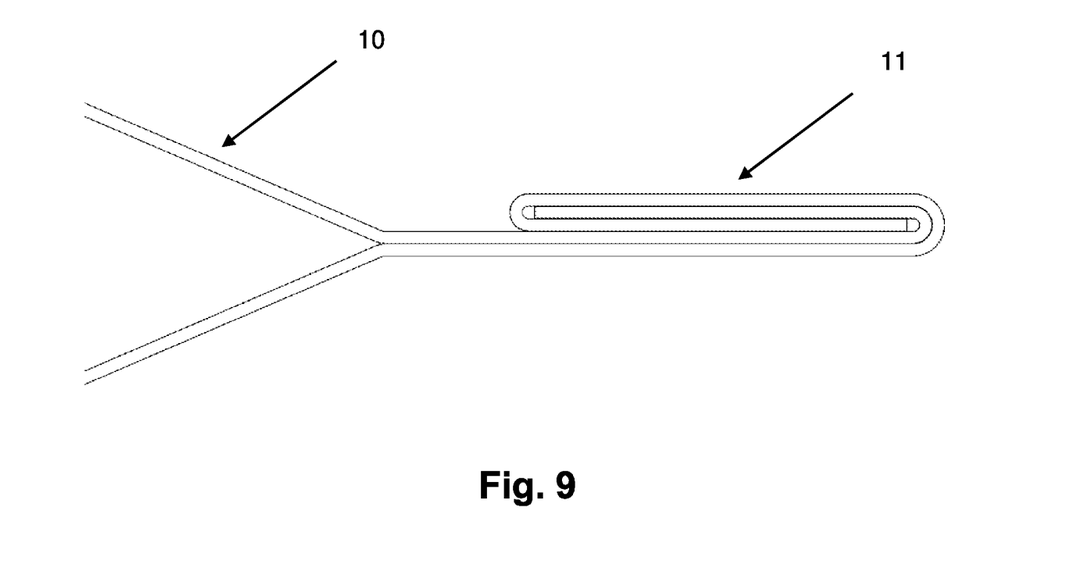
FIG. 9 shows a view of a double hem of a plate joint.

The basic building block of a counterflow enthalpy heat exchanger 1 are heat and humidity exchange plates 10, which are arranged in parallel one above the other and are connected to each other on parts of their circumferences. Thus, alternating flow-through inter-plate spaces are formed between the pairs of heat and humidity exchange plates 10, forming air channels 2 for air flow in direction A from the enclosed indoor space to the outdoor space and air channels 3 for air flow in direction B from the outdoor space to the enclosed indoor space. The heat and humidity exchange plates 10 allow heat and humidity transfer from the heated and humid air discharged from the ventilated space to the cold drier air supplied from the outdoor space inwards. The heat and humidity exchange plate 10 is formed by a moulded piece which is shaped on both sides into a corrugated and embossed surface creating protrusions and depressions to generate turbulent flow. It follows from the above that each of the inner plates 10 lies between the air channels 2, 3 in which air flows in the opposite direction. The connection of the heat and humidity exchange plates 10 is made at the edges by pressing with a double hem 11 of the joint, thereby preventing air leakage from the space between the plates 10 in the respective air channel 2, 3.

The heat and humidity exchange plate 10 assembly is inserted and fixed in the housing 4 of the counterflow enthalpy heat exchanger 1.

Figure 2:
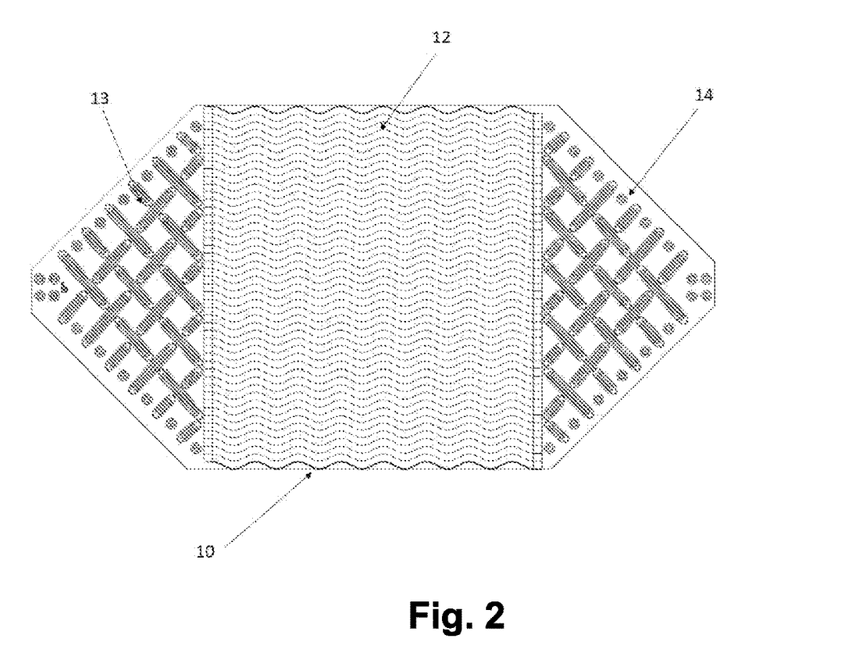
FIG. 2 shows a heat and humidity exchange plate of the heat exchanger.

The heat and humidity exchange plate 10 comprises a supporting member 101, whose at least one side is covered with a vapour-permeable polymeric membrane 102. The supporting member 101 is formed by an expanded metal structure 1010. The central portion 12 of the plate 10 has a shape of a rectangular quadrilateral, at whose ends are formed end portions 13, 14 which taper away from the central portion 12 and the plate 10 is shaped into a corrugated or embossed surface, the shaping of the corrugated or embossed surface in the central portion 12 being different from the shaping of the corrugated or embossed surface of the end portions 13, 14. The shaping of the end portions 13, 14 serves to guide air to the central portion 12 and to generate turbulent flow.

Figure 3:
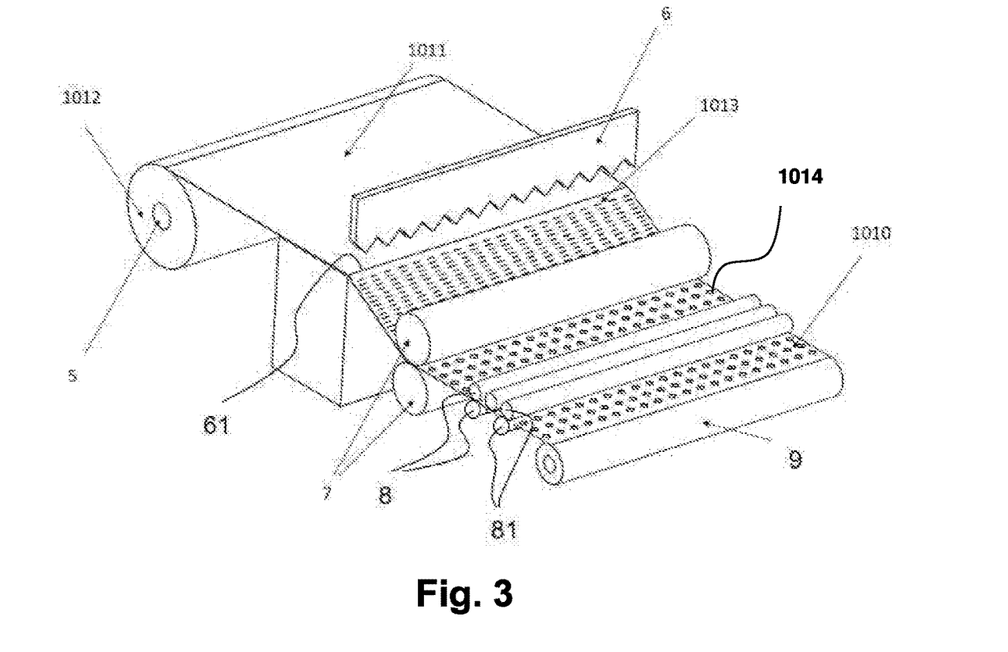
FIG. 3 shows a diagram of creating an expanded metal structure.
Figure 4:
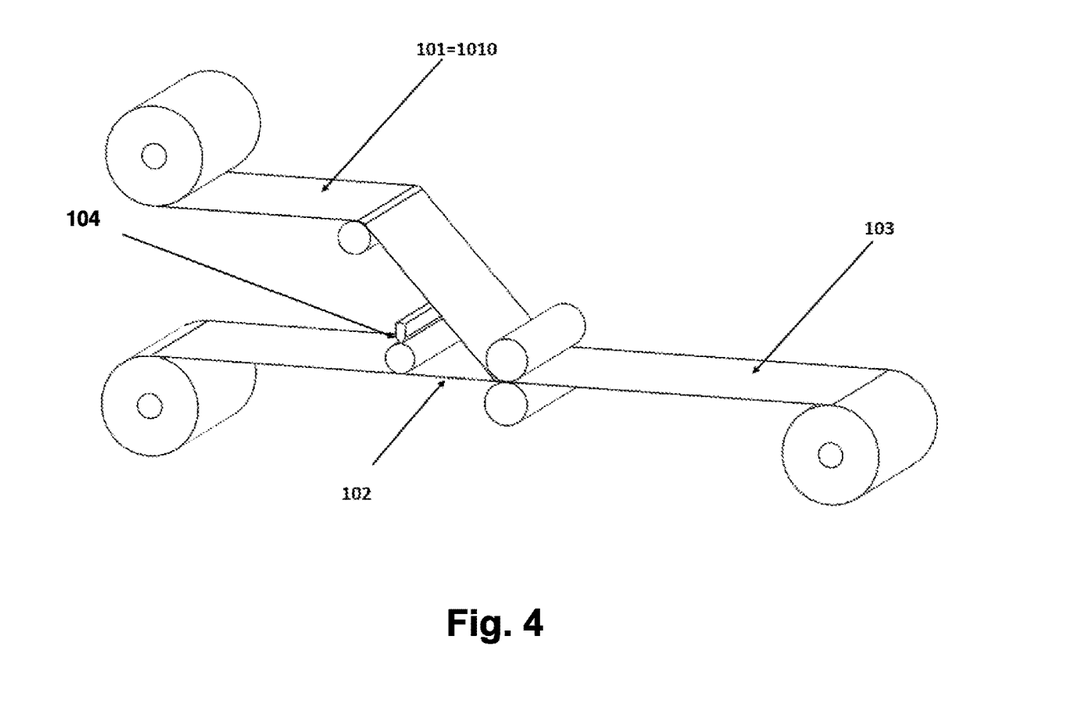
FIG. 4 shows a diagram of the connection of the expanded metal structure to a vapour-permeable polymeric membrane.

The expanded metal structure 1010 which constitutes the supporting member 101 of the heat and humidity exchange plate 10 can be produced from both sheets and coils. In an exemplary embodiment according to the invention, production from coils is preferred due to very low thickness of the starting metal foil 1011. The expanded metal structure 1010 is produced by making a series of cuts in the metal foil 1011 which is drawn from a coil 1012 disposed on a feeding roll 5, in the transverse direction, and after slitting, the metal foil 1011 is stretched in the longitudinal direction.

Figure 5:
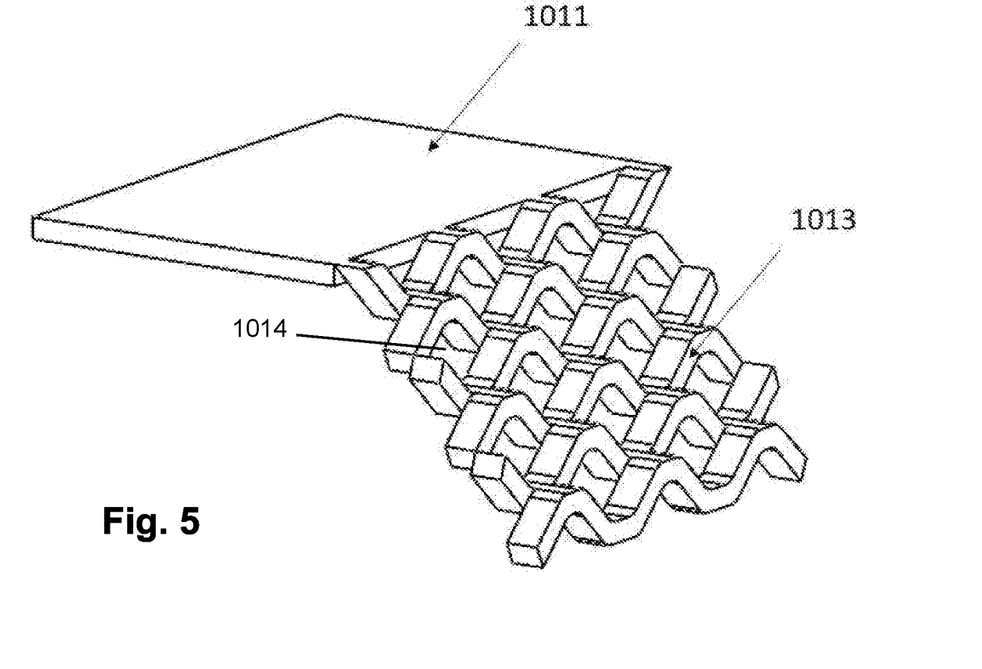
FIG. 5 is a view of the starting metal foil with a part slit and stretched.
Figure 6:
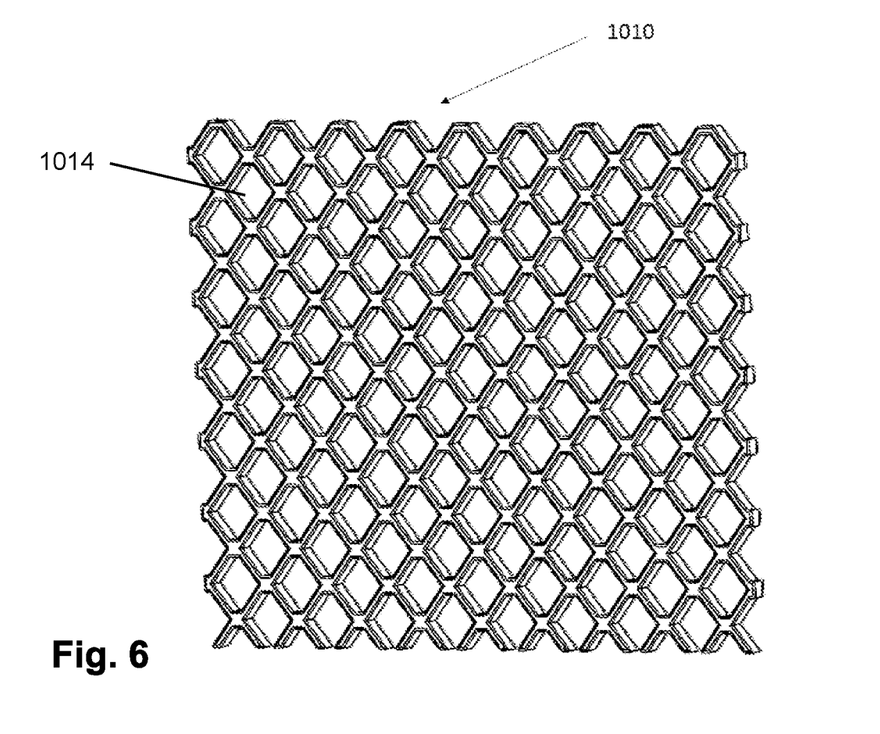
FIG. 6 is a view of a part of the expanded metal structure after rolling.

The slitting device is shown schematically in FIG. 3 only by a slitting knife 6, which is arranged between the feeding roll 5 and a withdrawal device 7. After slitting, cuts 1013 are formed in the metal foil 1011 behind the cutting edge 61. The foil 1011 with the cuts 1013 passes through the withdrawal device 7 formed by a pair of rollers and is subjected to a longitudinal tensile stress induced by a drawing device 8 formed by a pair of rollers which rotate at a higher speed than the rollers of the withdrawal device 7. By stretching, the cuts 1013 expand in the longitudinal direction, and holes 1014 are formed in the metal foil. After stretching, the material has a slightly corrugated surface because the cut portions rotate slightly vertically during drawing, as shown in FIG. 5. Therefore, it is necessary to subsequently roll this material, which is shown in FIG. 3, by a rolling device 81. This results in a flat surface with holes and a metal expanded structure 1010 is formed, which is subsequently wound on a winding roll 9. The amount of elongation in the longitudinal direction is in the range of 20 to 70% of the original length of the metal foil.

Another variant, not shown in detail, is the formation of holes 1014 in the metal foil 1011 immediately after it has been slit by the slitting knife 6, wherein the withdrawal device 7 of the slit metal foil 1011 is omitted in the device and the longitudinal tension in the metal foil 1011 is achieved by the different speeds of the feeding roll 5 and the rolling device 81. In this embodiment, holes 1014 are formed immediately after being slit, but again, they are formed without any loss of material of the metal foil 1011. Here, too, it is a completely waste-free technology.

Figures 7A, 7B:
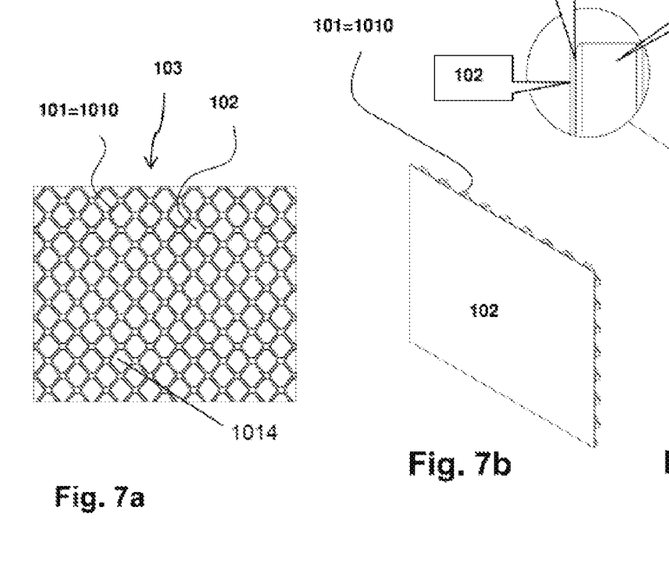
FIG. 7a is a front view of a semi-finished product for the production of the heat and humidity exchange plates.
FIG. 7b is an axonometric view of the semi-finished product for the production of the heat and humidity exchange plates.
Figure 7C:
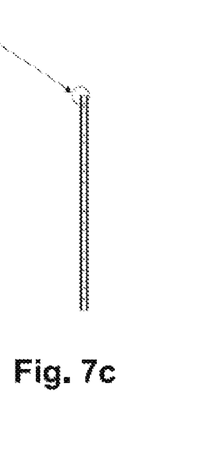
FIG. 7c is a side view of the semi-finished product for the production of the heat and humidity exchange plates.

Due to the fact that in the production of the expanded metal structure 1010 the ductility of the used metal material is usually exhausted and due to the fact that in the last step of the production of the heat and humidity exchange plate 10 according to the invention embossed elements are created, ensuring the turbulent flow of the passing air for better heat and moisture transfer between the exhaust and supply air, the ductility of the material must be restored. This is achieved by a controlled annealing process of the expanded metal structure 1010, either sequentially in the area of the structure or preferably in its finished coil, where the coil of the expanded structure is transferred to an annealing furnace in which annealing takes place. In this case, it is advantageous to monitor the temperature also in the coil cavity during annealing. The annealing process is usually followed by activation of the surface of the expanded metal structure 1010, for example chemically by using isopropanol or physically by plasma treatment using ionization. Also, the corresponding side of the polymeric vapour-permeable membrane 102 may be activated in the same manner. This is followed by connecting at least one side of the expanded metal structure 1010 to the vapour-permeable polymeric membrane 102, for example, by gluing after applying the glue from a glue applicator 104, as shown in FIG. 2, or by thermocompression. Thus, a semi-finished product is formed 103 for the production of the heat and humidity exchange plates 10. The connection of the expanded metal structure 1010 to the thin vapour-permeable polymeric membrane 102 is performed over the entire width of the expanded metal structure 1010 and the strip of the vapour-permeable polymeric membrane 102, as shown in FIGS. 7*a*, 7*b*, 7*c*. It is apparent from a detail in FIG. 7*c* that the supporting member 101 consisting of a strip of the expanded metal structure 1010, is connected to the vapour-permeable polymeric membrane 102 by means of a layer of glue 1041. The semi-finished product 103 thus created can be used for any dimensions of heat exchange plates and humidity exchange plates 10. The vapour-permeable polymeric membrane 102 can be formed on the expanded metal structure 1010 also by applying a liquid polymer and curing it.

Figure 8A:
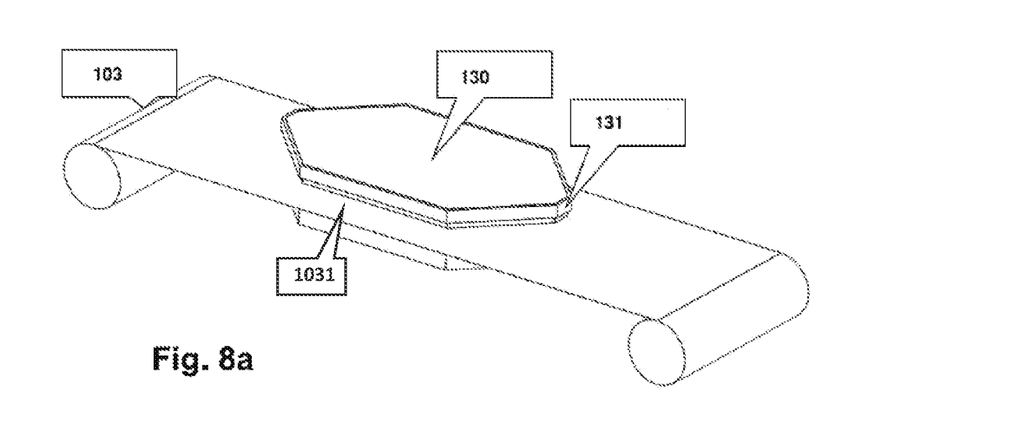
FIGS. 8a, 8b show the formation of the heat and humidity exchange plate.
Figure 8B:
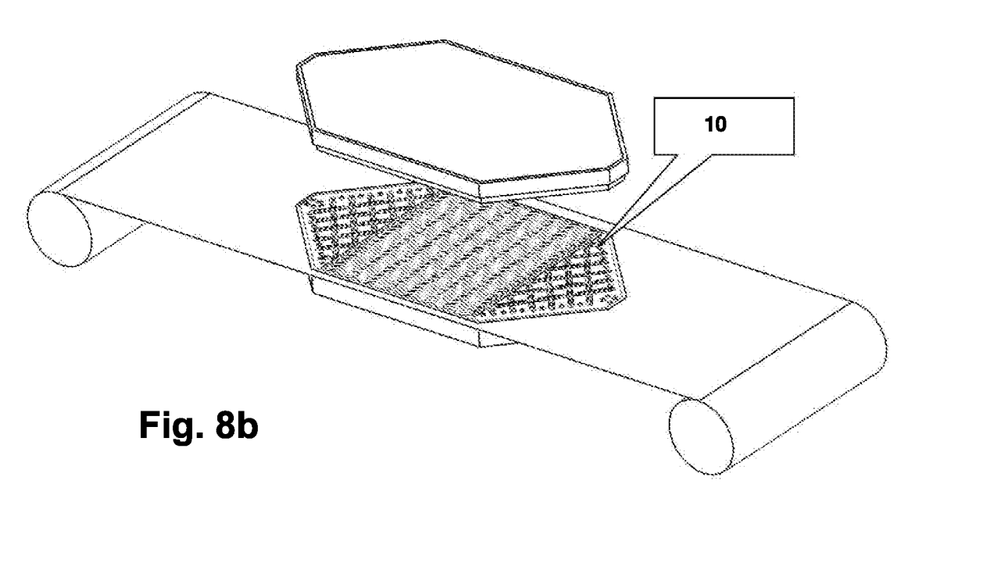

Subsequently, corrugated or embossed structures are formed by omnidirectional deformation, for example by pressing, and the excess material 1031 is cut to form the heat and humidity exchange plate 10 of the desired shape. This can be done in one operation or separately. This process is schematically shown in FIG. 8*a*, where a shaping plate 130 provided on its circumference with a cutting knife 131 rests on the semi-finished product 103 formed by a metal expanded structure 1010 and a vapour-permeable polymeric film 102, whereupon the heat and humidity exchange plate 10 is formed and cut out after its tilting off. The plates 10 produced are then joined into assemblies to form a counterflow enthalpy heat exchanger 1, whereby the connection of the individual plates 10 is made by pressing with a double hem 11 in order to seal the joint perfectly and to prevent unwanted secondary air leakage at the plate 10 joints because the expanded metal structure 1010 provided with the vapour-permeable polymeric membrane 102 is formed over the entire surface of the plate 10 and there is a risk of parasitic air leakage if the connection between the plates 10 is imperfect.

INDUSTRIAL APPLICABILITY

The invention can be used for economical air conditioning and ventilation of residential and industrial buildings, where it ensures the supply of fresh air with highly efficient heat and moisture recovery from the exhaust air. In winter, there is no discomfortable excessive reduction of internal humidity in the building. Furthermore, there is no need to solve condensate drainage from the heat exchanger in the ventilation unit. In addition, there is no risk of condensate freezing in the heat exchanger and therefore there is no need to address its frost protection, for example, it is not necessary to install an energy-inefficient electric outdoor air preheater in the ventilation system.

List of References
 1 counterflow enthalpy heat exchanger
 10 heat and humidity exchange plate
 101 supporting member
 1010 expanded metal structure
 1011 starting metal foil
 1012 coil of the starting metal foil
 1013 cuts in the metal foil
 1014 holes in the metal foil
 102 vapour-permeable polymeric membrane
 103 semi-finished product for the production of heat and humidity exchange plates
 104 glue applicator
 1041 glue
 11 double hem of the plate joint
 12 central portion of the plate
 13,14 end portions of the plate
 2 air channel in direction A
 3 air channel in direction B
 4 exchanger housing
 5 feeding roll
 6 slitting knife
 61 cutting edge
 7 withdrawal device of the cut metal foil
 8 drawing device
 81 rolling device
 9 winding roll of the expanded metal structure
 130 forming plate
 131 cutting knife

The invention claimed is:

1. A method of manufacturing a heat and humidity exchange plate for an air-to-air counterflow enthalpy heat exchanger, the method comprising the following steps:
   (a) continuously forming a supporting member of the exchange plate in a form of an expanded metal structure from a strip of metal foil by sitting the metal foil in a transverse direction, then stretching the metal foil in a longitudinal direction, and then rolling over an entire width of the strip of stretched metal foil;
   (b) annealing the expanded metal structure;
   (c) providing a vapour-permeable polymeric membrane on the annealed expanded metal structure;
   (d) forming corrugated and embossed shaped elements on the annealed expanded metal structure with the vapour-permeable polymeric membrane applied thereon by means of omnidirectional deformation; and
   (e) creating a circumferential shape of the exchange plate by removing excess edges from the annealed expanded metal structure with the vapour-permeable polymeric membranes.

2. The method according to claim 1, wherein an amount of elongation of the strip of metal foil from the stretching in the longitudinal direction is in a range of 20% to 70%.

3. The method according to claim 1, wherein steps (d) and (e) are performed in a single process step.

4. The method according to claim 1, wherein the expanded metal structure is formed from aluminum or an aluminum alloy.

5. The method according to claim 1, wherein the annealing is carried out continuously.

6. The method according to claim 1, wherein the annealing is carried out after winding the expanded metal structure onto winding coils, wherein the winding coils are then inserted into an annealing furnace.

7. The method according to claim 1, wherein after the annealing, the expanded metal structure is provided with the vapour-permeable polymeric membrane by applying a liquid polymer to the expanded metal structure which, when cured, forms the vapour-permeable polymeric membrane.

8. The method according to claim 1, wherein after the annealing, the expanded metal structure is provided with the vapour-permeable polymeric membrane by attaching a strip of the vapour-permeable polymeric membrane to the expanded metal structure.

9. The method according to claim 8, wherein before attaching the strip of the vapour-permeable polymeric membrane, a surface of the expanded metal structure or a surface of the vapour-permeable polymeric membrane is activated chemically or by plasma treatment.

10. The method according to claim 8, wherein the strip of the vapour-permeable polymeric membrane is attached over an entire width of the expanded metal structure.

11. The method according to claim 8, wherein the strip of the vapour-permeable polymeric membrane is attached to the expanded metal structure by gluing.

\* \* \* \* \*